United States Patent
Bhat et al.

(10) Patent No.: US 7,848,781 B2
(45) Date of Patent: Dec. 7, 2010

(54) TECHNIQUES TO MANAGE CONTACT INFORMATION FOR A SUBSCRIBER IDENTITY MODULE

(75) Inventors: Vijay Bhat, San Francisco, CA (US); David Champlin, Menlo Park, CA (US); Niraj Bali, Sunnyvale, CA (US); Nancy Gayed, San Francisco, CA (US); Mark Eastwood, Shrewsbury (GB)

(73) Assignee: Palm, Inc., Sunnyvale, CA (US)

( * ) Notice: Subject to any disclaimer, the term of this patent is extended or adjusted under 35 U.S.C. 154(b) by 301 days.

(21) Appl. No.: 11/365,201

(22) Filed: Feb. 28, 2006

(65) Prior Publication Data
US 2007/0202749 A1 Aug. 30, 2007

(51) Int. Cl.
H04B 1/38 (2006.01)
H04M 1/00 (2006.01)
(52) U.S. Cl. ...................... 455/558; 455/566
(58) Field of Classification Search .............. 455/557, 455/558, 556.1, 556.2
See application file for complete search history.

(56) References Cited

U.S. PATENT DOCUMENTS
6,212,529 B1 * 4/2001 Boothby et al. ............ 707/201
2005/0059418 A1 * 3/2005 Northcutt ................ 455/517
2005/0153740 A1 * 7/2005 Binzel et al. ............. 455/558
2006/0019689 A1 * 1/2006 Pantalone et al. .......... 455/518

FOREIGN PATENT DOCUMENTS
WO WO02/071219 A2 9/2002
WO WO2006/010242 A1 2/2006

* cited by examiner

Primary Examiner—Michael T Thier
(74) Attorney, Agent, or Firm—Kacvinsky Daisak PLLC

(57) ABSTRACT

Techniques to manage contact information are described. An apparatus may comprise a mobile computing device. The mobile computing device may include a subscriber identity module having a first set of contact information. The mobile computing device may also include a contact management module. The contact management module may include a subscriber identity module cache manager to retrieve the first set of contact information from the subscriber identity module and store it in a subscriber identity module cache. The contact management module may also include a contact information database having a second set of contact information. The contact management module may further include a contact database manager to retrieve the first set of contact information from the contact information database and the second set of contact information from the subscriber identity module cache for a contact application. Other embodiments are described and claimed.

10 Claims, 6 Drawing Sheets

TECHNIQUES TO MANAGE CONTACT INFORMATION FOR A SUBSCRIBER IDENTITY MODULE

BACKGROUND

A mobile computing device such as a smart phone may have voice and data communications capabilities as well as processing capabilities. The processing capabilities may allow a mobile computing device to store and execute a number of application programs, such as a contact application or personal information manager (PIM) application, for example. A PIM may comprise software to manage contact information for multiple entities. For example, a user may use the PIM to search for a telephone number in order to initiate a telephone call. As memory resources for mobile computing devices increase, however, the volume of contact information stored by the PIM application may increase as well. Consequently, this may increase the amount of time needed to retrieve certain contact information from the PIM application. Accordingly, there may be a need for improved techniques to solve these and other problems.

DETAILED DESCRIPTION

Various embodiments may be directed to techniques for managing contact information for a mobile computing device. In one embodiment, for example, a mobile computing device may include a contact management module (CMM). The CMM may be arranged to manage contact information for the mobile computing device. For example, a subscriber identity module (SIM) may store a first set of contact information, such as telephone numbers, addresses, and so forth. The CMM may include a SIM cache manager (SIMCM) arranged to retrieve the first set of contact information from the SIM, and store it in a SIM cache. The CMM may also include a contact database manager (CDM) and a contact information database (CID) to store a second set of contact information. The CDM may be arranged to retrieve the first set of contact information from the CID and the second set of contact information from the SIM cache for a contact application, such as a PIM, for example. In this manner, the CMM may potentially reduce the amount of time needed to retrieve a given set of contact information, particularly from data sets stored on external memory such as a SIM card. Other embodiments are described and claimed.

Figure 1:
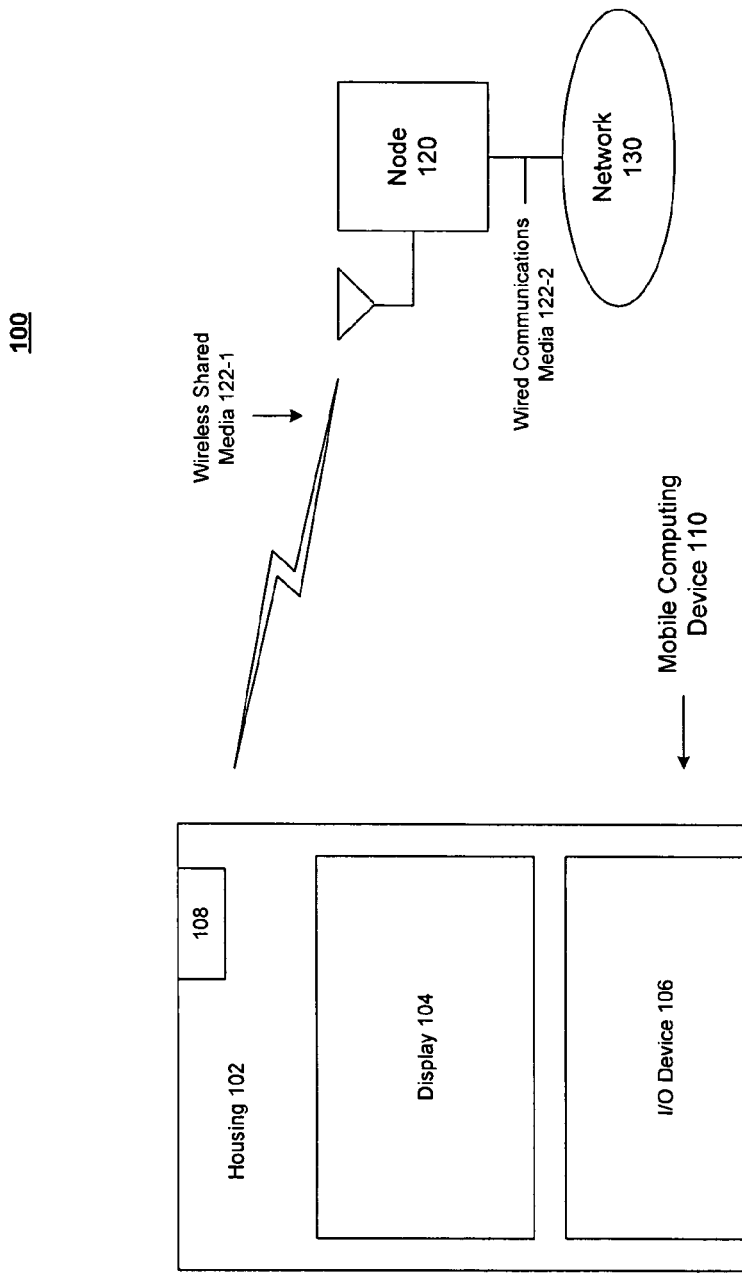
FIG. 1 illustrates one embodiment of a communications system.

FIG. 1 illustrates one embodiment of a communications system 100. In various embodiments, communications system 100 may be implemented as a wireless communication system, a wired communication system, or a combination of both. When implemented as a wireless communication system, communications system 100 may include components and interfaces suitable for communicating over wireless shared media 122-1, such as one or more antennas, transmitters, receivers, transceivers, amplifiers, filters, control logic, and so forth. An example of wireless shared media 122-1 may include portions of a wireless spectrum, such as the RF spectrum and so forth. When implemented as a wired communications system, communications system 100 may include components and interfaces suitable for communicating over wired communications media 122-2, such as input/output (I/O) adapters, physical connectors to connect the I/O adapter with a corresponding wired communications medium, a network interface card (NIC), disc controller, video controller, audio controller, and so forth. Examples of wired communications media 122-2 may include a wire, cable, metal leads, printed circuit board (PCB), backplane, switch fabric, semiconductor material, twisted-pair wire, co-axial cable, fiber optics, and so forth. The embodiments are not limited in this context.

In various embodiments, communications system 100 may include a mobile computing device 110. Mobile computing device 110 may comprise any device having a processing system and a portable power source (e.g., a battery). Examples of a mobile computing device may include a computer, laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth. Examples of a mobile computing device may also include computers that are arranged to be worn by a person, such as a wrist computer, finger computer, ring computer, eyeglass computer, belt-clip computer, arm-band computer, shoe computers, clothing computers, and other wearable computers. In one embodiment, for example, mobile computing device 110 may be implemented as a smart phone having both wireless voice and/or data communications capabilities, as well as processing capabilities. Although some embodiments may be described with mobile computing device 110 implemented as a smart phone by way of example, it may be appreciated that other embodiments may be implemented using other mobile computing devices as well. The embodiments are not limited in this context.

As shown in FIG. 1, mobile computing device 110 may comprise a housing 102, a display 104, an input/output (I/O) device 106, and an antenna 108. Display 104 may comprise any suitable display unit for displaying information appropriate for a mobile computing device. I/O device 106 may comprise any suitable I/O device for entering information into a mobile computing device. Examples for I/O device 106 may include an alphanumeric keyboard, a numeric keypad, a touch pad, input keys, buttons, switches, rocker switches, microphones, audio interfaces, video interfaces, and so forth. The embodiments are not limited in this context.

In one embodiment, communications system 100 may include a wireless device 120. Wireless device 120 may comprise, for example, a mobile or fixed wireless device. In one embodiment, for example, wireless device 120 may comprise a fixed wireless device operating as an access point for a network or communications system, such as a cellular radiotelephone communications system, a wireless local area network (WLAN), a wireless metropolitan area network (WMAN), a wireless wide area network (WWAN), and so forth. Examples for wireless device 120 may include a wireless access point, base station or device B, base station radio/transceiver, router, switch, hub, gateway, and so forth. In one embodiment, for example, wireless device 120 may comprise a base station for a cellular radiotelephone communications system. Although some embodiments may be described with wireless device 120 implemented as a base station by way of example, it may be appreciated that other embodiments may be implemented using other wireless devices as well. The embodiments are not limited in this context.

In one embodiment, mobile computing device 110 and wireless device 120 may comprise part of a cellular radiotelephone system. Examples of cellular radiotelephone systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth. The embodiments are not limited in this context.

In addition to voice communication services, mobile computing device 110 and wireless device 120 may be arranged to perform data communications using any number of different wireless protocols over wireless shared media 122-1. In one embodiment, for example, mobile computing device 110 and wireless device 120 may be arranged to perform data communications using any number of different WWAN data communication services. Examples of cellular data communication systems offering WWAN data communication services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, and so forth. In one embodiment, for example, mobile computing device 110 and wireless device 120 may also be arranged to communicate using a number of different WLAN data communication services. Examples of suitable WLAN data communication services may include the Institute of Electrical and Electronics Engineers (IEEE) 802.xx series of protocols, such as IEEE 802.11a/b/g/n, IEEE 802.16, IEEE 802.20, and so forth. In one embodiment, for example, mobile computing device 110 and wireless device 120 may be further arranged to communicate using a number of shorter range wireless protocols, such as a wireless personal area network (PAN) protocols, an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may include near-field communication techniques and protocols, such as electro-magnetic induction (EMI) techniques. An example of EMI techniques may include passive or active radio-frequency identification (RFID) protocols and devices. The embodiments are not limited in this respect.

In one embodiment, communications system 100 may include network 130 connected to wireless device 120 by wired communications medium 122-2. Network 130 may comprise additional devices and connections to other networks, including a voice/data network such as the Public Switched Telephone Network (PSTN), a packet network such as the Internet, a local area network (LAN), a metropolitan area network (MAN), a wide area network (WAN), an enterprise network, a private network, and so forth. In one embodiment, for example, network 130 may be arranged to communicate information in accordance with one or more Internet protocols as defined by the Internet Engineering Task Force (IETF), such as the Transmission Control Protocol/Internet Protocol (TCP/IP), for example. Network 130 may also include other cellular radio telephone system infrastructure and equipment, such as base stations, mobile subscriber centers, central offices, and so forth. The embodiments are not limited in this context.

In general operation, mobile computing device 110 may be capable of storing and executing a number of application programs. One example of an application program may include a contact management application such as a PIM application. A PIM application may manage contact information for multiple entities. For example, a user may use the PIM application to search for contact information, such as a telephone number to initiate a telephone call or text messaging, an email address to send an email message, a network address or universal resource locator (URL) to establish a data connection to the Internet and/or World Wide Web (WWW), and so forth. The contact information may be stored in one or more CID.

One metric used to measure performance of a PIM application may be the response time needed to search and retrieve a given set of contact information from a particular CID. A user typically desires immediate access to the contact information managed by the PIM application. Response times, however, may vary considerably in accordance with a number of factors, such as the size of the CID, the type of memory used to store the CID, processing capabilities, bus speeds, system architecture, and so forth. Consequently, techniques to reduce response times may be needed for mobile computing device 110. Accordingly, the embodiments attempt to reduce response times by addressing some or all of the above factors.

One factor that may affect search and retrieval times may be the size of a CID storing the contact information. In general, retrieval times may increase as the size of the CID increases. The size of contact information databases have been increasing at a rapid pace. Recent development of ubiquitous network services such as the Internet has led to the availability of electronic databases having larger volumes of contact information in electronic form. Examples of such databases may include commercial databases, business databases, private databases, personal databases, white page databases, yellow page databases, alumni databases, corporate databases, social relationship databases, and so forth. A user may download the larger databases from network 130, thereby making them locally available to a user of mobile computing device 110. As a result, mobile computing device 110 may potentially increase a size for its CID from hundreds of contact information records to thousands of contact information records or more. In some cases, the size of the CID may exceed memory resources for mobile computing device 110, thereby creating the need to store the CID using some form of external memory.

Another factor that may affect search and retrieval times may be the type of memory unit used to store the contact information. Mobile computing device 110 may have access to various types of external memory units. Examples of external memory units may include removable SIM cards, external magnetic hard drives, flash memory drives, network drives, and so forth. The external memory units may be used to store larger contact information databases, or different types of contact information databases based on anticipated use. For example, a first SIM card may be used to store a personal CID, while a second SIM card may be used to store a business CID. A user may then use the first SIM card during weekends and vacations, and the second SIM card during business hours. One disadvantage of external memory units, however, is memory access times. A processor for mobile computing device 110 typically has slower access to external memory than to system memory, such as an L1 or L2 memory cache stored on the same die as the processor, or accessible via a high-speed memory bus. Consequently, a PIM application attempting to access contact information from external memory units may experience slower response times, which may be potentially undesirable to a user.

In order to solve these and other problems, mobile computing device 110 may use various techniques to improve response times for a PIM application. In one embodiment, for example, mobile computing device 110 may include a CMM. The CMM may be arranged to manage contact information for mobile computing device 110. For example, a SIM may store a first set of contact information. The CMM may include a SIMCM arranged to retrieve the first set of contact information from the slower SIM card, and store it in a faster SIM cache. The SIM cache may be some form of non-volatile system memory, such as flash memory, for example. SIMCM may copy the first set of contact information to the SIM cache once mobile computing device 110 has been powered on. The CMM may also include a CDM and a CID to store a second set of contact information. The CDM may be arranged to retrieve the first set of contact information from the SIM cache and the second set of contact information from the CID for a contact application, such as a PIM application, for example. In this manner, the CMM may potentially reduce the amount of time needed to retrieve a given set of contact information, particularly from data sets stored on external memory such as a SIM card. Mobile computing device 110 in general, and the CMM in particular, may be described in more detail with reference to FIGS. 2-6.

Figure 2:
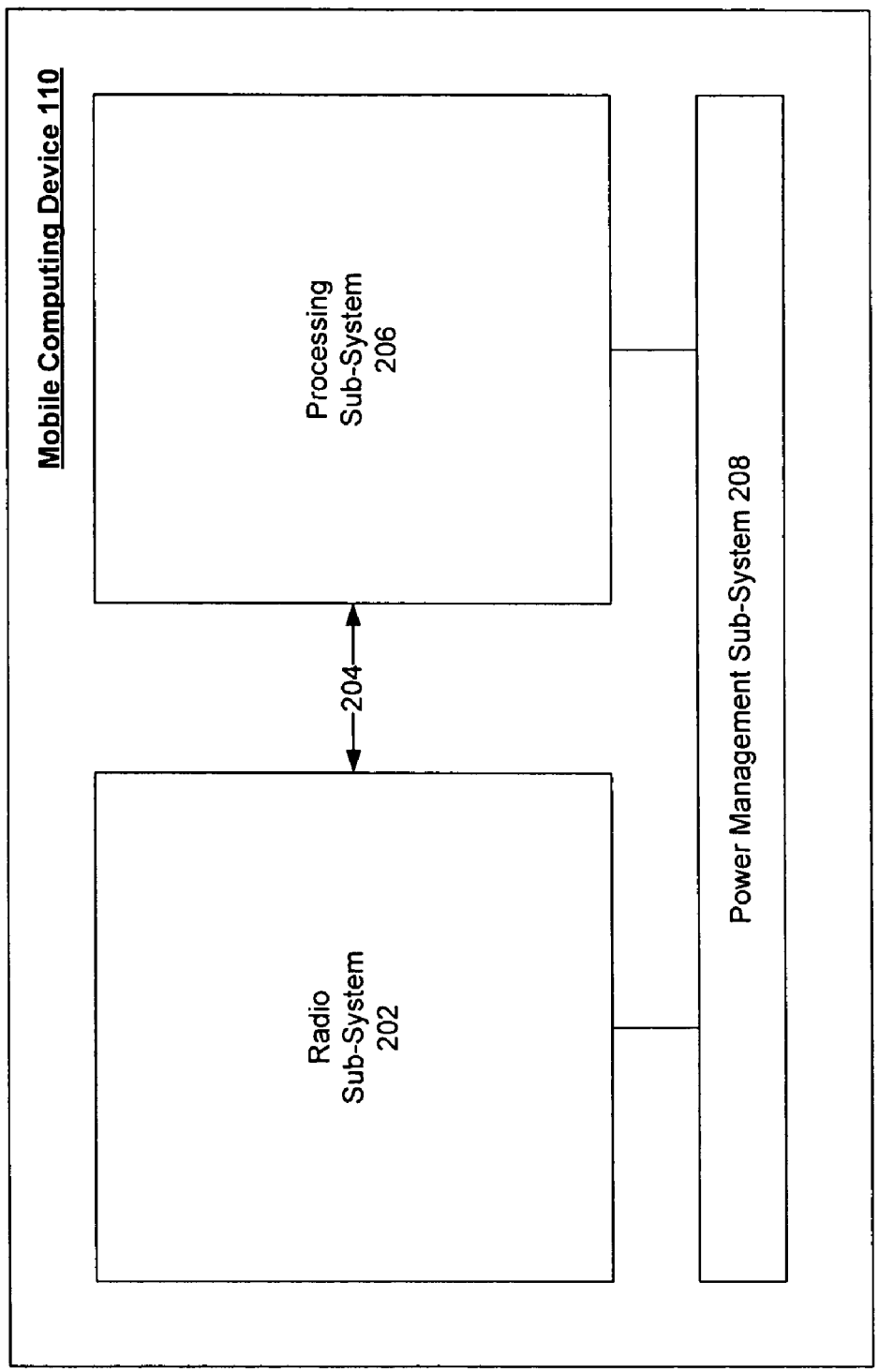
FIG. 2 illustrates one embodiment of a mobile computing device.

FIG. 2 illustrates one embodiment a mobile computing device. FIG. 2 illustrates a more detailed block diagram of mobile computing device 110 as described with reference to FIG. 1. As shown in FIG. 2, mobile computing device 110 may comprise multiple elements. Although FIG. 2 shows a limited number of elements in a certain topology by way of example, it can be appreciated that more or less elements in any suitable topology may be used in mobile computing device 110 as desired for a given implementation. Furthermore, any element as described herein may be implemented using hardware, software, or a combination of both, as previously described with reference to device implementations. The embodiments are not limited in this context.

In various embodiments, mobile computing device 110 may include a radio sub-system 202 connected via bus 204 to a processing sub-system 206. Radio sub-system 202 may perform voice and data communications operations using wireless shared media 122-1 for mobile computing device 110. Processing sub-system 206 may execute software for mobile computing device 110. Bus 204 may comprise a USB or micro-USB bus and appropriate interfaces, as well as others.

In various embodiments, mobile computing device 110 may also include a power management sub-system 208. Power management sub-system 208 may manage power for mobile computing device 110, including radio sub-system 202, processing sub-system 206, and other elements of mobile computing device 110. For example, power management sub-system 208 may include one or more batteries to provide direct current (DC) power, and one or more alternating current (AC) interfaces to draw power from a standard AC main power supply. The embodiments are not limited in this context.

Figure 3:
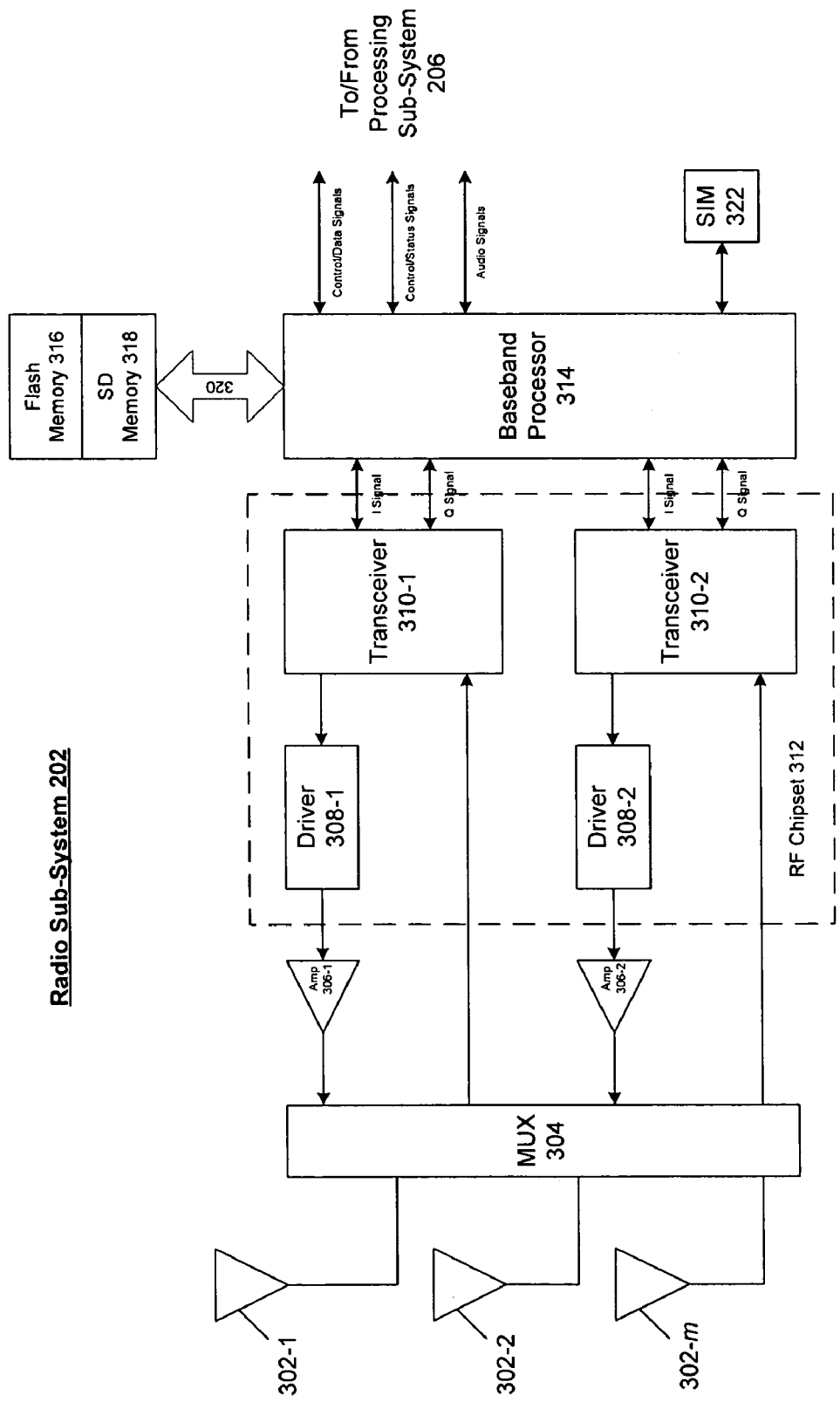
FIG. 3 illustrates one embodiment of a radio sub-system.

FIG. 3 illustrates one embodiment a radio sub-system. FIG. 3 illustrates a more detailed block diagram of radio sub-system 202 as described with reference to FIG. 2. Radio sub-system 202 may perform voice and data communication operations for mobile computing device 110. For example, radio sub-system 202 may be arranged to communicate voice information and control information over one or more assigned frequency bands of wireless shared media 122-1. The embodiments are not meant to be limited, however, to the example given in FIG. 3.

In various embodiments, radio sub-system 202 may include one or more antennas 302-1-$m$. Antennas 302-1-$m$ may be used for transmitting and/or receiving electrical signals. Examples for antennas 302-1-$m$ may include an internal antenna, an omni-directional antenna, a monopole antenna, a dipole antenna, an end fed antenna, a circularly polarized antenna, a micro-strip antenna, a diversity antenna, a dual antenna, an antenna array, a helical antenna, and so forth. During transmission, antennas 302-1-$m$ may accept energy from a transmission line and radiate this energy into space via wireless shared media 122-1. During reception, antennas 302-1-$m$ may gather energy from an incident wave received over wireless shared media 122-1, and provide this energy to a corresponding transmission line. The amount of power radiated from or received by antennas 302-1-$m$ is typically described in terms of gain. Radio sub-system 202 may be implemented using a single antenna 302-1, or using an array of antennas 302-1-$m$ array, such as a quad band antenna array, for example. Multiple antennas may be desirable when implementing spatial diversity and/or Multiple-Input-Multiple-Output (MIMO) systems. The embodiments are not limited in this context.

In various embodiments, antennas 302-1-$m$ may be connected to a multiplexer 304. Multiplexer 304 multiplexes signals from power amplifiers 306-1, 306-2 for delivery to antennas 302-1-$m$. Multiplexer 304 demultiplexes signals received from antennas 302-1-$m$ for delivery to RF chipset 312. The embodiments are not limited in this context.

In various embodiments, multiplexer 304 may be connected to power amplifiers 306-1, 306-2. Power amplifiers 306-1, 306-2 may be used to amplify any signals to be transmitted over wireless shared media 122-1. Power amplifiers 306-1, 306-2 may work in all assigned frequency bands, such as 4 frequency bands in a quad-band system. Power amplifiers 306-1, 306-2 may also operate in various modulation modes, such as Gaussian Minimum Shift Keying (GSMK) modulation suitable for GSM systems and 8-ary Phase Shift Keying (8-PSK) modulation suitable for EDGE systems. The embodiments are not limited in this context.

In various embodiments, power amplifiers 306-1, 306-2 may be connected to an RF chipset 312. RF chipset 312 may also be connected to multiplexer 304. In one embodiment, for example, RF chipset 312 may comprise one or more transceivers in a transceiver array. For example, RF chipset 312 may include RF drivers 308-1, 308-2 each coupled to RF transceivers 310-1, 310-2, respectively. RF chipset 312 may perform modulation and direct conversion operations required for GMSK and 8-PSK signal types for quad-band E-GPRS radio, for example. RF chipset 312 receives analog I & Q signals from a baseband processor 314, and converts them to an RF signal suitable for amplification by power amplifiers 306-1, 306-2. Similarly, RF chipset 312 converts the signals received from wireless shared media 122-1 via antennas 302-1-$m$ and multiplexer 304 to analog I & Q signals to be sent to baseband processor 314. RF chipset 312 may be implemented using one or more chips as desired for a given implementation. The embodiments are not limited in this context.

In some embodiments, each transceiver 310-1, 310-2 may be arranged to perform data communications in accordance with a different set of wireless communications protocols and techniques. In one embodiment, for example, transceiver 310-1 may be arranged to communicate information in accordance with a first class of wireless communications protocols and techniques that are generally associated with cellular radiotelephone communication systems. Examples of the first class of protocols may include WWAN protocols, such as GSM/GPRS protocols, CDMA/1xRTT protocols, EDGE protocols, EV-DO protocols, EV-DV protocols, HSDPA protocols, and so forth. In one embodiment, for example, transceiver 310-2 may be arranged to communicate information in accordance with a second class of wireless communications protocols and techniques that are generally associated with a computer network. Examples of the second class of protocols may include WLAN protocols, such as one or more of the IEEE 802.xx series of protocols, such as IEEE 802.11a/b/g/n, IEEE 802.16, IEEE 802.20, and so forth. Other examples of the second class of protocols may include PAN protocols, Infrared protocols, Bluetooth protocols, EMI protocols including passive or active RFID protocols, and so forth. It may be appreciated that although the various protocols have been generally separated into a first class and a second class, it may be appreciated that transceivers 310-1, 310-2 may be arranged to use any type of protocol from either class as desired for a given implementation. It may also be appreciated that although RF chipset 312 is shown with two transceivers 310-1, 310-2 by way of example, RF chipset 312 may be implemented using more or less transceivers as desired for a given implementation. The embodiments are not limited in this respect.

In various embodiments, RF chipset 312 may be connected to baseband processor 314. Baseband processor 314 may perform baseband operations for radio sub-system 202. Baseband processor 314 may comprise both analog and digital baseband sections. The analog baseband section includes I & Q filters, analog-to-digital converters, digital-to-analog converters, audio circuits, and other circuits. The digital baseband section may include one or more encoders, decoders, equalizers/demodulators, GMSK modulators, GPRS ciphers, transceiver controls, automatic frequency control (AFC), automatic gain control (AGC), power amplifier (PA) ramp control, and other circuits. The embodiments are not limited in this context.

In various embodiments, baseband processor 314 may also be connected to one or more memory units via a memory bus 320. In one embodiment, for example, baseband processor 314 may be connected to a flash memory unit 316 and a secure digital (SD) memory unit 318. Memory units 316, 318 may be removable or non-removable memory. In one embodiment, for example, baseband processor 314 may use approximately 1.6 megabytes of static read-only memory (SRAM) for E-GPRS and other protocol stack needs.

In various embodiments, baseband processor 314 may also be connected to a subscriber identity module (SIM) 322. Baseband processor 314 may have a SIM interface for SIM 322. SIM 322 may comprise a smart card that encrypts voice and data transmissions and stores data about the specific user so that the user can be identified and authenticated to the network supplying voice or data communications. SIM 322 may also store data such as personal phone settings specific to the user and phone numbers. SIM 322 can be removable or non-removable. The embodiments are not limited in this context.

In various embodiments, baseband processor 314 may further include various interfaces for communicating with a host processor of processing sub-system 206. For example, baseband processor 314 may have one or more universal asynchronous receiver-transmitter (UART) interfaces, one or more control/status lines to the host processor, one or more control/data lines to the host processor, and one or more audio lines to communicate audio signals to an audio sub-system of processing sub-system 206. The embodiments are not limited in this context.

Figure 4:
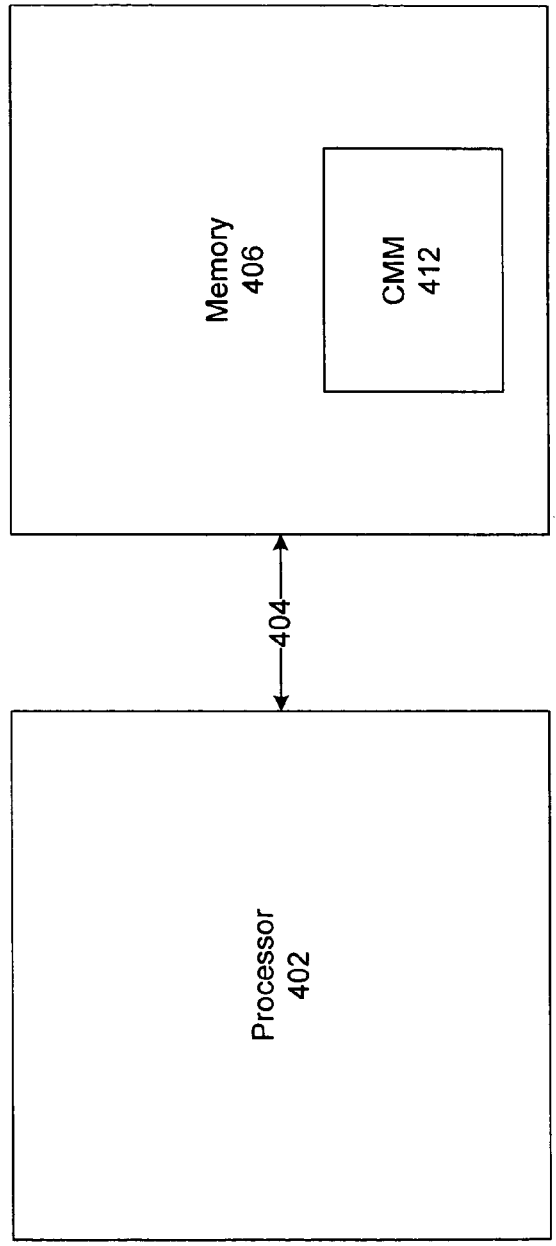
FIG. 4 illustrates one embodiment of a processing sub-system.

FIG. 4 illustrates one embodiment a processing sub-system. FIG. 4 illustrates a more detailed block diagram of processing sub-system 206 as described with reference to FIG. 2. Processing sub-system 206 may provide computing or processing operations for mobile computing device 110. For example, processing sub-system 206 may be arranged to execute various software programs for mobile computing device 110. Although processing sub-system 206 may be used to implement certain operations for various embodiments as software executed by a processor, it may be appreciated that the operations performed by processing sub-system 206 may also be implemented using hardware circuits or structures, or a combination of hardware and software, as desired for a particular implementation. The embodiments are not limited in this context.

In various embodiments, mobile computing device 110 may be capable of executing various types of software programs using processing sub-system 206. Software programs may be generally grouped into application programs and system programs. Application programs allow a user to accomplish one or more specific tasks. Typical applications include office suites, business software, educational software, databases, communications software, computer games, and so forth. Examples of application programs may include mail programs, web browsers, personal information manager applications, calendar programs, scheduling programs, contact management programs, gaming programs, word processing programs, spreadsheet programs, picture management programs, video reproduction programs, audio reproduction programs, groupware programs, and so forth. Most application software has a graphical user interface (GUI) to communicate information between a device and a user. System programs assists in the running of a computer system. System programs may be directly responsible for controlling, integrating, and managing the individual hardware components of the computer system. Examples of system programs may include operating systems (OS), device drivers, programming tools, utility programs, software libraries, interfaces, program interfaces, API, and so forth.

In various embodiments, processing sub-system 206 of mobile computing device 110 may be capable of executing various types of system programs, such as different OS. In computing, an OS is the system software responsible for the direct control and management of hardware and basic system operations. Additionally, it provides a foundation upon which to run application software such as word processing programs and web browsers. Mobile computing device 110 may utilize any OS suitable for smaller form factor devices, such as a Palm OS®, Palm OS® Cobalt, Microsoft Windows® CE, Microsoft Pocket PC, Symbian OS™, Embedix OS, and others. The embodiments are not limited in this context.

In various embodiments, processing sub-system 206 may include processor 402. Processor 402 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 402 may be implemented as a general purpose processor, such as a processor made by Intel® Corporation, Santa Clara, Calif. Processor 402 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments, however, are not limited in this context.

In one embodiment, processing sub-system 206 may include memory 406 to connect to processor 402. Memory 406 may be implemented using any machine-readable or computer-readable media capable of storing data, including both volatile and non-volatile memory. For example, memory 406 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 406 may be included on the same integrated circuit as processor 402 thereby obviating the need for bus 404. Alternatively some portion or all of memory 406 may be disposed on an integrated circuit or other medium, for example a hard disk drive, that is external to the integrated circuit of processor 402, and processor 402 may access memory 406 via memory bus 404. The embodiments are not limited in this context.

In various embodiments, memory 406 may store one or more software components. A software component may refer to one or more programs, or a portion of a program, used to implement a discrete set of operations. In one embodiment, for example, memory 406 may include one or more software components, such as a contact management module (CMM) 412. CMM 412 may be responsible for certain contact management operations of mobile computing device 110. It is worthy to note that although some embodiments may describe these modules as software components executed by processing sub-system 206, it may be appreciated that some or all of the operations of the software components may be implemented using other processors accessible by mobile computing device 110, such as baseband processor 314, for example. Furthermore, these modules may also be implemented using dedicated hardware circuits or structures, or a combination of dedicated hardware and software, as desired for a given implementation. The embodiments are not limited in this context.

In various embodiments, CMM 412 may be integrated with, or form part of, a PIM application. Examples of a PIM application may include Microsoft® Outlook™, Palm® Contacts, and so forth. The PIM application may maintain separate sets of contact information for various entities (e.g., an individual, group, business, and so forth) using various data structures, such as contact information records with one or more defined fields. The particular type of PIM application used with CMM 412 is not limited in this context. Alternatively, CMM 412 may be independent elements arranged to operate with an existing PIM program. In this case, CMM 412 may have the appropriate interfaces to communicate information with the resident PIM program to implement all or some of the operations described herein. The embodiments are not limited in this context.

In various embodiments, CMM 412 may perform contact management operations for mobile computing device 110. More particularly, CMM 412 may manage contact information for mobile computing device 110. The contact information may include any information used to establish voice and/or data communications between devices. The contact information may include one or more contact identifiers. A contact identifier may be a unique identifier for a device or user. Examples of contact identifiers may include a telephone number, an email address, a network address, an IP address, an IPv4 address, an IPv6 address, a URL, a domain name, a hardware address (e.g., a media access controller address), voice over IP (VoIP) tags, instant messaging (IM) addresses, Skype accounts, photo tags, location information, and so forth. The embodiments are not limited in this context.

In various embodiment, CMM 412 may decrease response times or access times by caching all the SIM phone book entries in non-volatile flash memory when the phone is turned on. Reading from non-volatile flash memory is generally much faster than reading from a SIM card, thereby providing a significant performance enhancement to mobile computing device 110. The cached entries may be stored in a SIM CID. The SIM CID database may have a backup flag turned off, so synchronization or backup operations will not unnecessarily transfer the cached entries to another device, such as a PC, another SIM card, or other storage media external to mobile computing device 110.

In various embodiments, CMM 412 may further allow a contact application to display the cached SIM phonebook entries as a separate category, such as a "SIM Phonebook" category, for example. When the user selects "All" in the contacts application, the cached SIM phonebook entries will appear in alphabetically sorted order along with the other contact information maintained by the contact application in other contact information databases. This may be achieved by abstracting the reading of various CID through a shared library. CMM 412 may be described in more detail with reference to FIG. 5.

Figure 5:
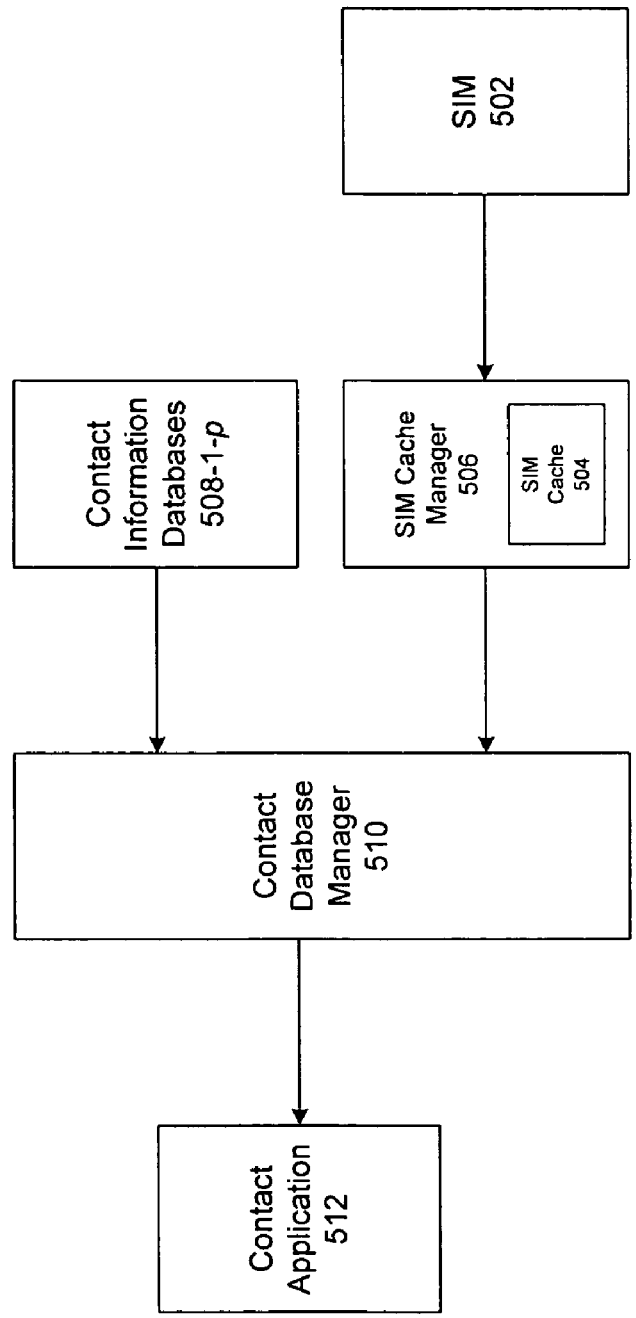
FIG. 5 illustrates one embodiment of a contact management module.

FIG. 5 illustrates one embodiment of a contact management module. FIG. 5 illustrates a more detailed block diagram of CMM 412. As shown in FIG. 5, CMM 412 may include a SIM 502, a SIM cache manager (SIMCM) 504, a SIM cache 506, a contact information database (CID) 508-1-$p$, a contact database manager (CDM) 510, and a contact application 512. Contact application 512 may be representative of, for example, a PIM application. Although FIG. 5 illustrates CMM 412 as having a limited number of elements by way of example, it may be appreciated that CMM 412 may include more or less elements as desired for a given implementation. The embodiments are not limited in this context.

In various embodiments, CMM 412 may include SIM 502. SIM 502 may be representative of, for example, SIM 322 as described with reference to FIG. 3. In one embodiment, for example, SIM 502 may comprise a removable smart card that is used to store contact information for a user. SIM 502 may be arranged to store any desired amount of data suitable for its form factor, such as approximately 2 gigabytes of memory or more, for example.

In various embodiments, CMM 412 may include a SIM cache 504. SIM cache 504 may comprise a cache used to store information received or retrieved from SIM 502. A cache may refer to a collection of data duplicating original values stored elsewhere or computed earlier, where the original data is expensive (e.g., usually in terms of access time) to fetch or compute relative to reading the cache. Once the data is stored in the cache, future use can be made by accessing the cached copy rather than refetching or recomputing the original data, thereby lowering memory access times.

SIM cache 504 may be implemented using any memory accessible to processor 402 that allows a memory access time (e.g., average memory access time) that is faster than retrieving the data directly from SIM 502. For example, SIM cache 504 may be implemented using some form of non-volatile system memory, such as a portion of memory 406, flash memory, and so forth. In another example, SIM cache 504 may be implemented on or near the same die as processor 402 to increase access times to the data coped from SIM 502 to SIM cache 504. The embodiments are not limited in this context.

In various embodiments, CMM 412 may include SIMCM 506. SIMCM 506 may be arranged to retrieve a first set of contact information from SIM 502. SIMCM 506 may store the first set of contact information in SIM cache 504. SIMCM 506 may perform such operations at anytime during operations of mobile computing device 110. In one embodiment, for example, SIMCM 506 may perform such operations once mobile computing device 110 has been powered on, during initialization operations, during reset operations, and so forth. In this manner, CMM 412 may potentially increase the speed with which a user can access SIM Phone book entries by caching them in non-volatile memory when the phone is powered on.

In various embodiments, CMM 412 may include CDM 510 and one or more CID 508-1-$p$. CDM 510 may perform various database management operations for CMM 412. In one embodiment, for example, CDM 510 may store, assign or associate the contact information with various CID 508-1-$p$. Given the increasing volumes of contact information stored by mobile computing device 110, CDM 510 may improve management of the volumes of contact information by creating, defining, modifying or updating multiple CID 508-1-$p$. A CID may refer to one or more databases arranged to store a particular type of contact information. For example, a personal CID may be created to store contact information for personal friends and family (e.g., a personal contact list, buddy list, and so forth). In another example, a business CID may be created to store contact information for a business entity. Other examples of a contact information database may include a personal contact list, a buddy list, a public database, a commercial database, a non-commercial database, a social database, a corporate database, subscriber or fee based databases, and any other resident or network-accessible databases. Examples of a public database may include a yellow page database, a white page database, an area code database, a government database, a census database, a mapping database, and any other publicly available database. Examples of social databases may include school alumni databases, personal network databases, and so forth. A personal networking database may comprise a database where each user may enter a list of names of other linked individuals known to the user, and the personal network database may cross-match the linked individuals to form new relationships between the users sharing a given linked individual. It may be appreciated that these are merely a few examples of a CID, and many other contact information databases exist that may be suitable for use with the embodiments as described herein. The embodiments are not limited in this context.

In various embodiments, one or more CID 508-1-$p$ may be stored locally by mobile computing device 110 via memory 406 or SIM 502. For example, a user may periodically download to mobile computing device 110 various commercial databases, such as a yellow pages directory, a white pages directory, an area code directory, and so forth. Furthermore, mobile computing device 110 may use various techniques to optimize search times for CID 508-1-$p$, such as loading CID 508-1-$p$ to a non-volatile memory cache during initialization of mobile computing device 110, ordering or indexing the data stored by CID 508-1-$p$ based on frequency, creating a cache for recently retrieved contact information or likely retrieved contact information (e.g., business contacts first, personal contacts second), and so forth. Alternatively, CID 508-1-$p$ may also be stored remotely from mobile computing device 110, such as by a web server accessible via network 130. In the latter case, CDM 510 may query the web server to retrieve the contact information from the remotely stored CID 508-1-$p$ via wireless device 120 and network 130.

In various embodiments, CDM 510 may operate as an abstraction layer to retrieve contact information from multiple CID, such as SIM cache 504 and one or more CID 508-1-$p$, for example. In one embodiment, for example, CDM 510 may retrieve a first set of contact information from SIM cache 504 for contact application 512 (e.g., a PIM application). CDM 510 may also retrieve a second set of contact information from one or more CID 508-1-$p$. CDM 510 may then send the first and second sets of retrieved or extracted contact information to contact application 512. In this manner, CDM 510 may manage or abstract contact information from multiple data sources on behalf of contact application 512. This may potentially reduce the amount of time needed to retrieve a given set of contact information, particularly from data sets stored on external memory such as SIM 502.

In various embodiments, contact application 512 may receive the first and second sets of contact information from CDM 510. Contact application 512 may integrate both sets of contact information into a single set of contact information, thereby potentially increasing convenience to the user by integrating various CID into a single user interface. Integrating both sets of contact information into a single set of contact information may allow a user to organize the contact information. For example, the single set of contact information may be sorted alphabetically by various fields, such as first name, last name, company name, social relationship, and so forth. In this manner, for example, contact application 512 may display contact information from a SIM CID alphabetically sorted along with any other contact information stored by one or more CID 508-1-$p$. Furthermore, each item or contact record from SIM 502 may be marked to indicate that it has been retrieved from SIM 502. For example, each item from SIM 502 may be marked with a prominent SIM card word, icon or symbol, for easier identification by a user. Alternatively, contact application 512 may display data from SIM 502 as a separate category for access by a user. The embodiments are not limited in this context.

In various embodiments, CDM 510 may manage when contact information stored by mobile computing device 110 is copied or backed up to another device, such as a PC during synchronization operations. In one embodiment, CDM 510 may set a backup parameter to indicate whether the first set of contact information stored by SIM cache 504 should be copied to another device during synchronization operations. For example, the backup parameter may be set to logic "1" to indicate that the first set of contact information stored by SIM cache 504 should be copied to another device during synchronization operations, and to a logic "0" to indicate no backup should be performed. In this manner, CMM 412 may be used to create and display a category for a contact information database that does not get backed up onto a PC after synchronization operations, since a copy is already stored by SIM 502.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
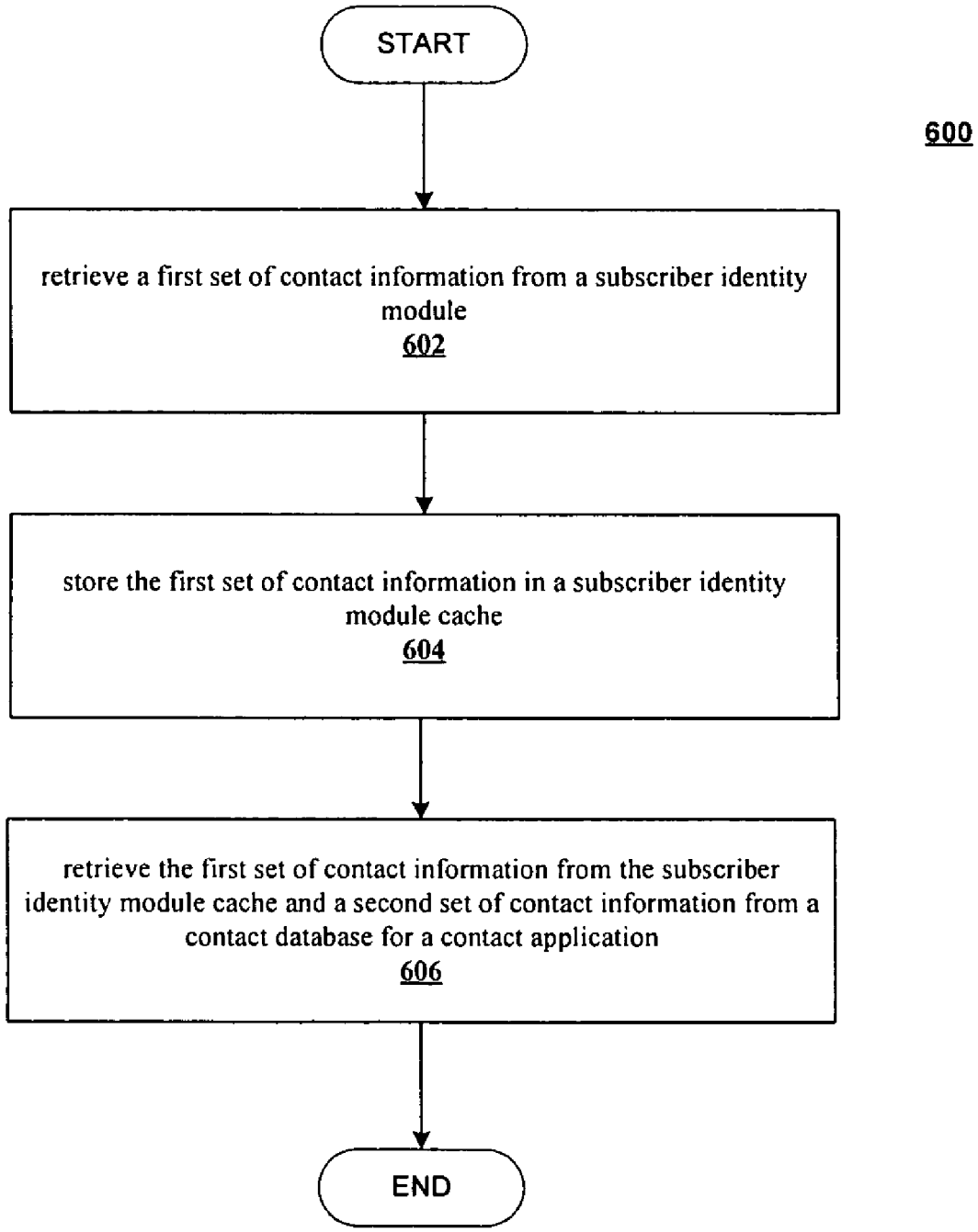
FIG. 6 illustrates one embodiment of a logic diagram.

FIG. 6 illustrates one embodiment of a logic flow. FIG. 6 illustrates a logic flow 600. Logic flow 600 may be representative of the operations executed by one or more embodiments described herein, such as mobile computing device 110. As shown in logic flow 600, a first set of contact information may be retrieved from a SIM at block 602. The first set of contact information may be stored in a SIM cache at block 604. The first set of contact information may be retrieved from the SIM cache and a second set of contact information may be retrieved from a CID for a contact application at block 606. The embodiments are not limited in this context.

In one embodiment, for example, the first and second sets of contact information may be received. Both sets of contact information may be integrated into a single set of contact information. The integrated set of contact information may be displayed on a display. The embodiments are not limited in this context.

In one embodiment, for example, the first set of contact information may be received. The first set of contact information may be displayed as SIM contact information on a display. The embodiments are not limited in this context.

In one embodiment, for example, the first set of contact information may be retrieved from the SIM when power is applied to a mobile computing device. The embodiments are not limited in this context.

In one embodiment, for example, a backup parameter may be set to indicate that the first set of contact information should not be copied to another device during synchronization operations. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations. The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to memory 406. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile computing device, comprising:
a subscriber identity module having a first set of contact information;
a contact management module to comprise:
a subscriber identity module cache manager to retrieve said first set of contact information of a first type from said subscriber identity module and store it in a subscriber identity module cache when the mobile computing device is powered on to reduce access times for said first set of contact information stored by the subscriber identity module;
a contact information database having a second set of contact information of a second type;
a contact database manager to retrieve said first set of contact information from said subscriber identity module cache and said second set of contact information from said contact information database;
a contact application to receive said first and second sets of contact information from said contact database manager, and integrate both sets of contact information into a single set of contact information;
a display to display said single set of contact information with contact information records from each of said first and second sets of contact information;
wherein said first set of contact information comprises:
all of the contact information records received from said subscriber identity module; and
wherein displaying said single set of contact information comprises:
displaying every contact information record within said first set of contact information with a mark to indicate that the contact information record was received from said subscriber identity module.

2. The mobile computing device of claim 1, said contact database manager to set a backup parameter to indicate said first set of contact information should not be copied to another device during synchronization operations.

3. A system, comprising:
a radio sub-system;
a processing sub-system to connect to said radio sub-system;
a subscriber identity module having a first set of contact information;
a contact management module to comprise:
a subscriber identity module cache manager to retrieve said first set of contact information of a first type from said subscriber identity module and store it in a subscriber identity module cache when a mobile computing device is powered on to reduce access times for said first set of contact information stored by the subscriber identity module;
a contact information database having a second set of contact information of a second type;
a contact database manager to retrieve said first set of contact information from said subscriber identity module cache and said second set of contact information from said contact information database;
a contact application to receive said first and second sets of contact information from said contact database manager, and integrate both sets of contact information into a single set of contact information;
a display to display said single set of contact information with contact information records from each of said first and second sets of contact information;
wherein said first set of contact information comprises:
all of the contact information records received from said subscriber identity module; and
wherein displaying said single set of contact information comprises:
displaying every contact information record within said first set of contact information with a mark to indicate that the contact information record was received from said subscriber identity module.

4. The system of claim 3, said contact database manager to set a backup parameter to indicate said first set of contact information should not be copied to another device during synchronization operations.

5. A method, comprising:
retrieving a first set of contact information of a first type from a subscriber identity module when a mobile computing device is powered on to reduce access times for said first set of contact information stored by the subscriber identity module;
storing said first set of contact information in a subscriber identity module cache;
retrieving said first set of contact information from said subscriber identity module cache and a second set of contact information of a second type from a contact information database for a contact application;
receiving said first and second sets of contact information;
integrating both sets of contact information into a single set of contact information;
displaying said single set of contact information with contact information records from each of said first and second sets of contact information;
wherein said first set of contact information comprises:
all of the contact information records received from said subscriber identity module; and
wherein displaying said single set of contact information comprises:
displaying every contact information record within said first set of contact information with a mark to indicate that the contact information record was received from said subscriber identity module.

6. The method of claim 5, comprising:
displaying said first set of contact information as subscriber identity module contact information on a display.

7. The method of claim 5, comprising setting a backup parameter to indicate said first set of contact information should not be copied to another device during synchronization operations.

8. An article comprising a non-transitory machine-readable storage medium containing instructions that if executed enable a system to retrieve a first set of contact information of a first type from a subscriber identity module when a mobile computing device is powered on to reduce access times for said first set of contact information stored by the subscriber identity module, store said first set of contact information in a subscriber identity module cache, and retrieve said first set of contact information from said subscriber identity module cache and a second set of contact information of a second type from a contact information database for a contact application, receive said first and second sets of contact information, integrate both sets of contact information into a single set of contact information, display said single set of contact information with contact information records from each of said first and second sets of contact information;
  wherein said first set of contact information comprises:
  all of the contact information records received from said subscriber identity module; and
  wherein displaying said single set of contact information comprises:
  displaying every contact information record within said first set of contact information with a mark to indicate that the contact information record was received from said subscriber identity module.

9. The article of claim 8, further comprising instructions that if executed enable the system to display said first set of contact information as subscriber identity module contact information on a display.

10. The article of claim 8, further comprising instructions that if executed enable the system to set a backup parameter to indicate said first set of contact information should not be copied to another device during synchronization operations.

\* \* \* \* \*